US008220169B2

(12) United States Patent
Goddard

(10) Patent No.: US 8,220,169 B2
(45) Date of Patent: Jul. 17, 2012

(54) METHOD AND SYSTEM FOR GUIDING A PLURALITY OF LOAD BEARING MEMBERS OF A FORKLIFT

(76) Inventor: Lawrence Auttlee Goddard, Hazlehurst, GA (US)

(*) Notice: Subject to any disclaimer, the term of this patent is extended or adjusted under 35 U.S.C. 154(b) by 0 days.

(21) Appl. No.: 12/880,074

(22) Filed: Sep. 11, 2010

(65) Prior Publication Data

US 2012/0060383 A1 Mar. 15, 2012

(51) Int. Cl.
*G01B 11/27* (2006.01)

(52) U.S. Cl. ........................................... 33/286; 33/264

(58) Field of Classification Search .................... 33/262, 33/263, 264, 286; 187/391
See application file for complete search history.

(56) References Cited

U.S. PATENT DOCUMENTS

| | | | | |
|---|---|---|---|---|
| 2,827,704 | A * | 3/1958 | Hunsicker | 33/264 |
| 5,131,801 | A * | 7/1992 | Melanson | 33/366.26 |
| 6,388,748 | B1 | 5/2002 | Kokura | |
| 6,713,750 | B2 | 3/2004 | Goddard | |
| 6,795,187 | B2 | 9/2004 | Kokura | |
| 6,827,363 | B1 * | 12/2004 | Amerson | 280/477 |
| 7,472,832 | B2 | 1/2009 | Lombardi, II | |
| 2003/0221916 | A1 * | 12/2003 | Dube et al. | 187/391 |
| 2005/0072010 | A1 * | 4/2005 | Parish | 3/333 |
| 2008/0011554 | A1 | 1/2008 | Broesel | |
| 2008/0167817 | A1 | 7/2008 | Messler | |
| 2009/0101447 | A1 | 4/2009 | Durham | |
| 2009/0144993 | A1 * | 6/2009 | Brauch | 33/286 |
| 2009/0241357 | A1 * | 10/2009 | Raschella et al. | 33/263 |
| 2011/0094116 | A1 * | 4/2011 | Diefenderfer | 33/286 |

* cited by examiner

*Primary Examiner* — G. Bradley Bennett
(74) *Attorney, Agent, or Firm* — Mitchell Law PLLC; Matthew W. Mitchell

(57) ABSTRACT

A light-based guidance system mountable on a forklift and method for guiding a plurality of load bearing members of a forklift is disclosed. The light-based guidance system includes first and second light sources disposed within a housing. The first light source is configured to emit a first light beam that is substantially parallel with the load bearing members. The method includes emitting a first light beam substantially parallel with the load bearing members, emitting a second light beam, and guiding the plurality of load bearing members based upon a position of irradiated light from the first and second light beams.

24 Claims, 8 Drawing Sheets

METHOD AND SYSTEM FOR GUIDING A PLURALITY OF LOAD BEARING MEMBERS OF A FORKLIFT

TECHNICAL FIELD

This disclosure relates generally to the field of forklift guidance systems. More particularly, the invention relates to such systems which utilize visible light means to provide visual indicators to the forklift operator indicating the location of the forks on a forklift relative to a rack and the access openings in a pallet or similar load.

BACKGROUND

The statements in this section merely provide background information related to the present disclosure and may not constitute prior art.

Forklifts or similar load handling equipment are designed to handle pallets and the like by inserting a pair of forks or tines into access openings provided between opposing deck members or the pallet legs for a single deck pallet. The forks are mounted in parallel on a carriage which can be raised or lowered vertically and usually also tilted slightly, with the forks extending typically a distance of between three feet and seven feet, although different forklifts may utilize different sized forks. The front of each fork is tapered or beveled to allow for a small margin of error during the insertion process. In a warehouse setting, it may be desirable to operate the forklifts to raise loads many feet off the ground such that multiple pallets can be stored in a vertical column, minimizing the amount of floor space taken up by stored goods. Thus, even though the operator is seated on the forklift itself and is therefore a few feet above ground level, the load may need to be deposited onto or retrieved from a stack, rack or shelf many feet above the operator.

The proximity of the operator to the forks and pallet and the line of sight of the operator relative to the forks and pallet make it difficult for the operator to determine if the forks are at the preferential height prior to advancing the forks forward to retrieve the load onto the stack, rack or shelf. Under these conditions, operators estimate the correct height of the forks, then advance the forks forward to determine, by striking the shelf, rack, pallet or the load itself when retrieving, that the forks are misaligned. This technique can result in damage to the pallets or loads and to the shelves or racks. Line of sight problems additionally inhibit accurate positioning and placement of pallets and loads unto a surface such as a rack or shelf. While depositing a load, the forklift operator's line of sight may be compromised by the pallet and/or load. To overcome these sight difficulties, forklift operators guess where to position the pallet when unloading. Errant estimates can result in rack and shelf damage, load and merchandise damage, and precariously stacked loads that may topple, causing further load damage and possible bodily injury. Accordingly, a need exists for a guidance system to indicate to the operator the position of the forks relative to the pallet and a position of the pallet relative to potential objects such as the rack, shelf, and/or shelved loads and pallets. This combination enables new levels of warehousing efficiency by improving loading and unloading times and saving considerable expense and improving service levels by decreasing misplaced and damaged loads.

SUMMARY

A light-based guidance system mountable on a forklift and method for guiding a plurality of load bearing members of a forklift is disclosed. The light-based guidance system includes first and second light sources disposed within a housing. The first light source is configured to emit a first light beam that is substantially parallel with the load bearing members. The method includes emitting a first light beam substantially parallel with the load bearing members, emitting a second light beam, and guiding the plurality of load bearing members based upon a position of irradiated light from the first and second light beams.

BRIEF DESCRIPTION OF THE DRAWINGS

One or more embodiments will now be described, by way of example, with reference to the accompanying drawings, in which.

DETAILED DESCRIPTION

Figure 1:
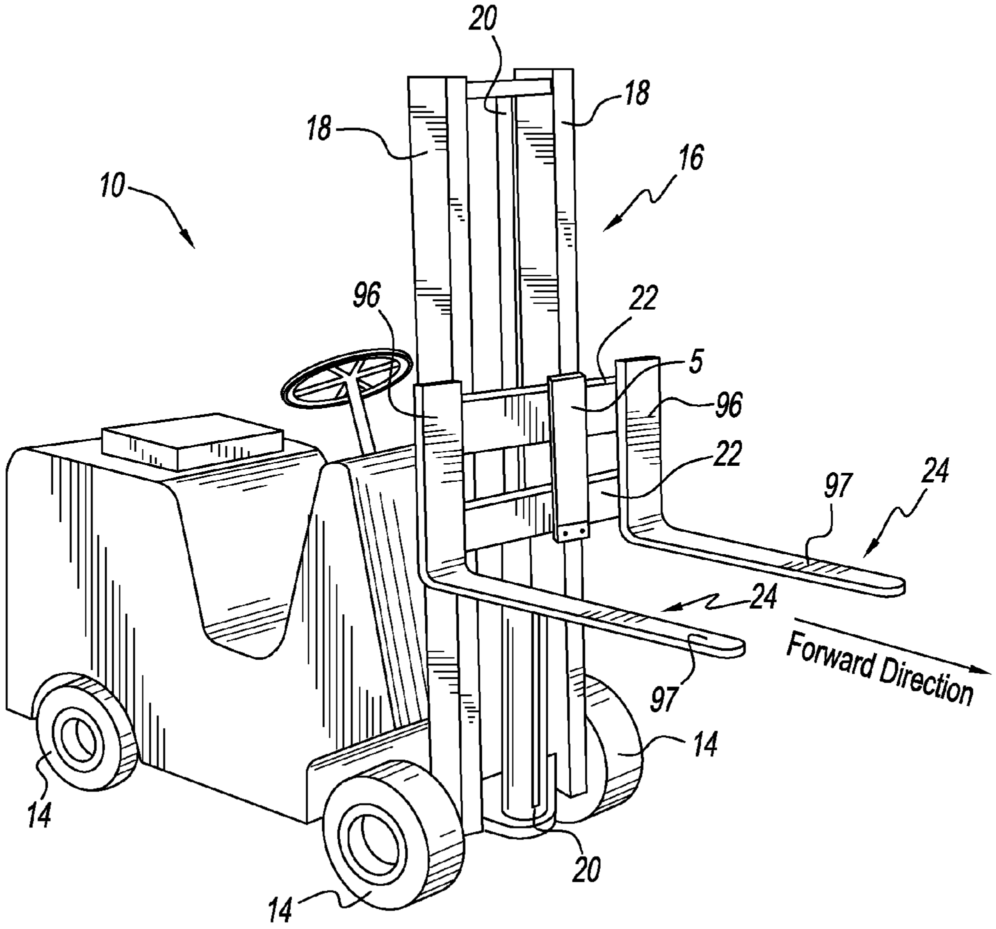
FIG. 1 depicts an exemplary forklift including a light-based guidance system, in accordance with the present disclosure.

Referring now to the drawings, wherein the depictions are for the purpose of illustrating certain exemplary embodiments only and not for the purpose of limiting the same, FIG. 1 depicts an exemplary forklift 10, including a light-based guidance system 5, which has been constructed in accordance with an embodiment of the disclosure. One skilled in the art will readily appreciate that the disclosure described herein may be readily applied to various forklifts and forklift systems, lift trucks other similar pieces of equipment, and is therefore not limited thereby.

The exemplary forklift 10 includes an operator area mounted on wheels 14 and a lift mechanism 16 comprising lift support tracks 18 and mast 20. The lift support tracks 18 are parallel with the mast 20. The lift mechanism 16 is mounted to a front of the forklift 10 in forward view of a forklift operator in the operator area. In one embodiment, the operator area includes forklift controls and an area for the forklift operator to ride the forklift 10. The forklift 10 includes a carriage assembly 22 configured to support a plurality of load bearing members, i.e., forks 24, by selectively traversing up and down the lift support track 18. In one embodiment, the mast 20 is a telescopic mast structure operatively connected to one or more hydraulic cylinders with piston rods to actuate the carriage 22 along the lift support tracks 18.

The forks 24 extend in a forward direction in a parallel configuration, and are adapted to fit into the access openings of a pallet configured to support a load. In one embodiment, the forks 24 are L-shaped, each with a horizontal forward-extending member 97 and vertical load stop member 96. In one embodiment, a position of the forks 24 with respect to a center position of the carriage 22 is adjustable. For example, adjusting the forks 24 towards the center of the carriage 22 may be preferential while working with smaller sized pallets. In operation, the forks 24 are inserted into a pallet, whereby the pallet can be raised from a rack, shelf or stack for subsequent transport. The forks 24 are inserted subsequent to raising or lowering the carriage 22 to the proper height relative to the pallet 101 and then advancing the forklift 10 in the forward direction, or the forklift carriage, in one embodiment. The forks 24 fit between legs of a single deck pallet or between the upper and lower deck members of a two deck pallet.

Figure 2:
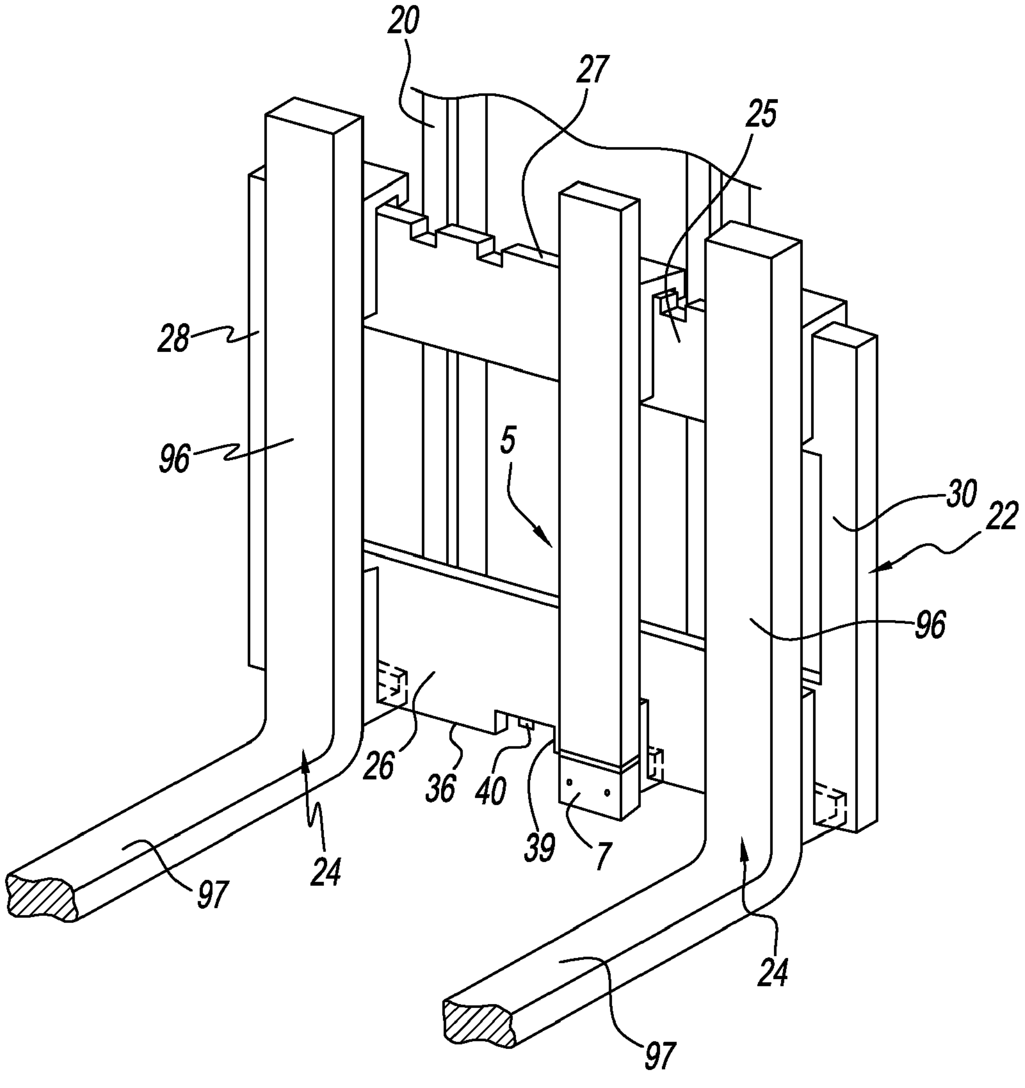
FIG. 2 is a perspective view of an exemplary carriage assembly of the forklift, in accordance with the present disclosure.

FIG. 2 depicts an exemplary carriage 22 of the forklift 10 including the light-based guidance system 5. The light-based guidance system 5 is coupled to the carriage 22 by a mounting apparatus as described herein below. A lighting housing module 7 is secured to the mounting apparatus by one of multiple methods such as by welding, adhesive or by mechanical means such as threaded bolts and/or fasteners.

As FIG. 2 shows, the carriage 22 includes a top support 25, a bottom support 26, and two side members 28 and 30 opposite one another and extending between the top and bottom supports 25 and 26. Top and bottom supports 25 and 26 extend in a substantially horizontal manner and side members 28 and 30 extend in a substantially vertical manner. In one embodiment, the top support 25 defines a top surface 27. Bottom support 26 defines a substantially linear bottom surface 36 and a notch or cavity 39 extending from bottom surface 36 into the remainder of support 26. In one embodiment, a bolt 40 is selectively thread from bottom surface 36, more specifically, the middle of the notch 39, into the bottom support 26. As such, a head of bolt 40 effectively extends into and obstructs notch 39. It should be understood that directional terminology used herein above, such as a "horizontal," "vertical," "top," "bottom," "front," and "back," are used herein for ease of description and identification purposes and should not be interpreted to limit the scope of the disclosure.

Figure 3:
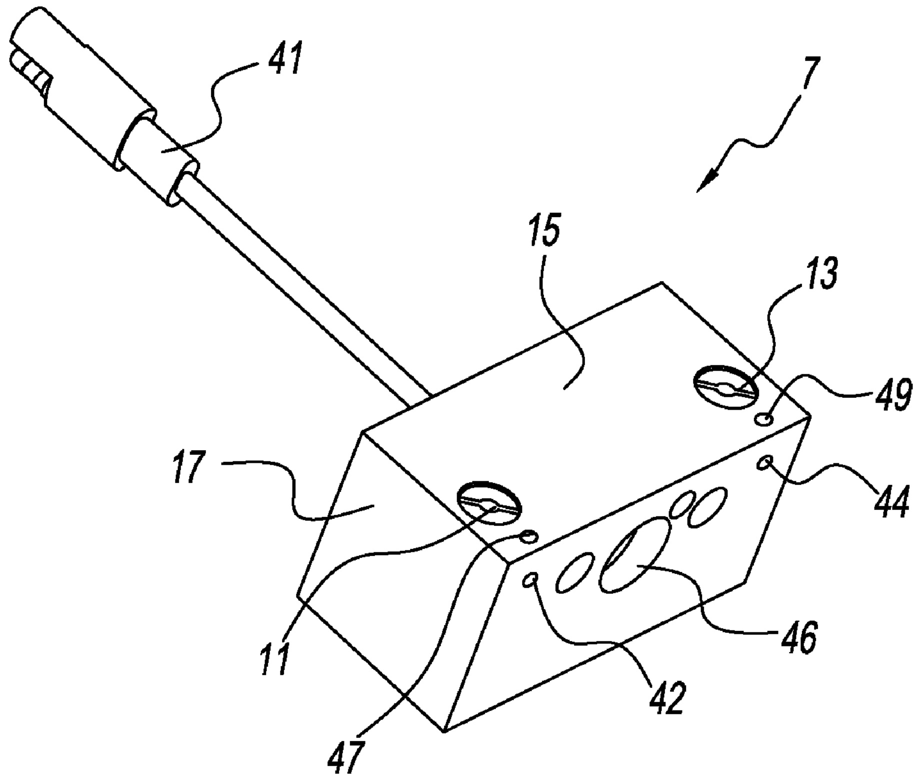
FIG. 3 is a perspective view of a lighting housing module of the light-based guidance system, in accordance with the present disclosure.

FIG. 3 depicts a perspective view of the lighting housing module 7, constructed in accordance with an embodiment of the disclosure. As FIG. 3 shows, the lighting housing module 7 includes a first and second light beam emitting devices 11 and 13 and an electrical connector 41. The electrical connector 41 is configured to carry electrical current to the lighting housing module 7 from any suitable power source including an internal battery contained in the mounting apparatus 50 as described herein below or a forklift battery substantially used to power motion and/or electrical operations, e.g., head lights, of the forklift 10. An angle the first and second light beam emitting devices 11 and 13 emit respective light beams can be calibrated along a vertical axis using a first and second adjustment mechanism 42 and 44, respectively. A first and second adjustment lock 47 and 49, respectively, can be included to lock the vertical calibration of the first and second adjustment mechanisms 42 and 44. In one embodiment, a ranging sensor 46 is included on the lighting housing module 7. As described herein below, the ranging sensor 46 may be any one of multiple systems configured to determine a height of the lighting housing module 7 with respect to a ground or floor level including light-based sensors utilizing photosensors or lasers, or sound-based sensors utilizing sonar such as an ultrasonic range finding device.

The first and second light beam emitting devices 11 and 13 may comprise any suitable apparatus for producing a collimated or focused beam of light in the visible spectrum, such as standard light bulbs or LEDs in combination with focusing lenses or mirrors, but is preferably comprised of a laser module configured to produce a controlled light beam. For example, laser modules containing a diode and focusing lens arrangement can produce a light beam with a wavelength between 300 to 1200 nm. Alternate colors may be produced using different wavelength ranges on the visible or infra-red light spectrum.

The first and second light beam emitting devices 11 and 13 are preferably disposed within a housing 15 of the lighting housing module 7, such as a substantially rectangular housing as depicted in FIG. 3.

The first light beam emitting device 11 is preferably vertically mounted within the housing 15 such that the trajectory of a first light beam is substantially parallel with the forks 24 and emitted on a same horizontal plane of the forks 24. In this way, the first light beam indicates an end point of a forward path trajectory of the forks 24 when the forks 24 are advancing. The first light beam emitting device 11 is preferably horizontally mounted towards a first side 17 of the lighting housing module 7 proximately located to a central position of the carriage 22. In one embodiment, the first light beam emitting device 11 may be horizontally mounted such that the first light beam substantially indicates a midpoint between the forks 24 after positioning the lighting housing module 7 in a central position of the carriage 22.

The second light beam emitting device 13 is vertically mounted within the housing 15 such that the trajectory of a second light beam may be utilized as a reference to align a forward path trajectory of a load disposed on top of the forks 24 with an unloading zone, such as a rack. Preferably, the trajectory of the second light beam is at an acute angle with respect to the trajectory of the first light beam emitted from the first light beam emitting device 11 and a horizontal axis. The angle is calibrated, in one embodiment, such that irradiated light from the light beam impinges an object, e.g., a rack, at a vertical height less than whereat irradiated light from the first light beam impinges the object. For example, the trajectory of the second light beam is pre-set to impinge a location on a rack corresponding to a predetermined vertical height less than a horizontal plane occupied by the forks 24. Using the irradiated light from the second light beam emitting device 13 as a reference, the forklift operator can guide the forks 24 and load. When the light beam impinges a location less than the predetermined vertical height, the forklift operator will know that the forks 24 and load are aligned such that the forks and load may be safely advanced forward. For example, if the predetermined vertical height distance is 3 inches a forklift operator unloading a load on a rack will know that the forks 24 must be aligned so that the impinging light beam is less than 3 inches down from a top of a rack before safely advancing the forks 24 and load.

In many operating conditions it may be advantageous for the forklift operator to readily distinguish between irradiated light from the first and second light beam emitting devices 11 and 13. Many methods are contemplated by this disclosure including distinguishing between the light beams using color, shape, and pulsated light beams, i.e., a light beam wherein the frequency of emission is recognizable by the human eye. For example, the second light beam emitting device 13 may produce a pulsated light beams while the second light beam emitting device 11 produces a continuous light beam, i.e., a light beam appearing to the human eye as a steady uninterrupted beam of light. In one embodiment, the first and second light beam emitting devices 11 and 13 each produce a controlled light beam corresponding to a different wavelength on the visible spectrum, and therefore irradiating different colors. For example, the first light beam emitting device 11 produces a controlled light beam corresponding to a red color on the visible light spectrum while the second light beam emitting device 13 produces a controlled light beam corresponding to a green color on the visible light spectrum.

As one skilled in the art will readily recognize, a lens may be fitted over one or more of the first and second light beam emitting devices 11 and 13 in such a manner to shape the controlled light beam into a shape. For example, one such lens may laterally elongate a light beam in such a manner that a horizontal line is irradiated on an opaque surface. In one embodiment of a lens, the light beam is shaped into a cross shape. The first and second light beam emitting devices 11 and 13 may be fitted with different lenses. In one embodiment, the first light beam emitting device 11 is fitted with a lens configured to shape the light beam into a dot shaped irradiation, while the second light beam emitting device 13 is fitted with a lens configured to shape the light beam into a horizontal line irradiation.

The light-based guidance system 5 is preferably mounted onto the carriage 22 such that it does not extend in the forward direction beyond the forward side of the vertical load stop members 96, and preferably mounted such that it does not extend at a vertical height greater than the linear bottom surface 36 of the bottom support 26 of the carriage 22. In this manner the first and second light beam emitting devices 11 and 13 do not contact the pallet when the forks 24 are fully inserted into the pallet, thereby protecting the first and second light beam emitting devices 11 and 13 and other components from damage. Many systems and methods for mounting the light-based guidance system 5 on the forklift 10 are contemplated by this disclosure including embodiments of a mounting system wherein the light-based guidance system 5 is coupled to the carriage 22 and embodiments of a mounting system wherein the light-based guidance system 5 is coupled to the vertical load stop member 96 of the fork 24.

Figure 4:
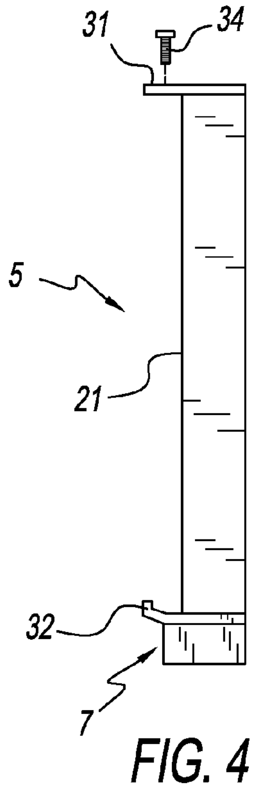
FIG. 4 is a side view of a first mounting apparatus and the light-based guidance system, in accordance with the present disclosure.
Figure 5:
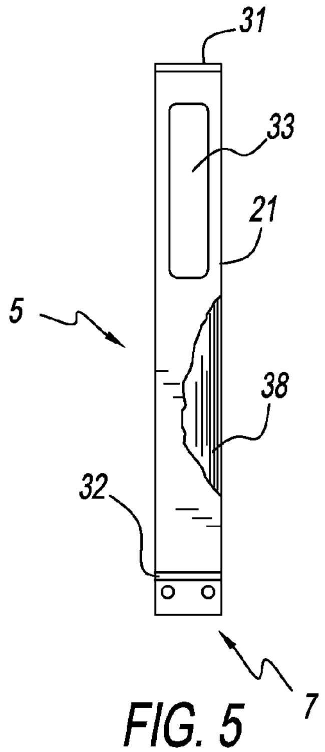
FIG. 5 is a forward perspective view of the first mounting apparatus and the light-based guidance system with a portion partially exposed to illustrate a battery, in accordance with the present disclosure.

FIGS. 4 and 5 depict a first mounting apparatus used to couple the light-based guidance system 5 to the carriage 22. FIG. 4 shows a side view of the first mounting apparatus and the light-based guidance system 5, while FIG. 5 is a forward perspective view of the first mounting apparatus and the light-based guidance system 5 with a portion partially exposed to illustrate a battery 38. As FIGS. 4 and 5 show, the first mounting apparatus includes a first and second bracket members 31 and 32 and a housing module 21. The first and second bracket members 31 and 32 may be attached to the housing module 21 using any one of multiple known methods including, e.g., welding, adhesive, and mechanical fasteners. In one embodiment the first and second bracket members 31 and 32 are forged together with the housing module 21.

The first bracket member 31 is configured to receive a mechanical fastener 34, such as a threaded bolt. The second bracket member 32 has a hook-like configuration which can be abutted against the underside of the bottom support 26 of the carriage 22. The first bracket member 31 is secured on top of the top support 24 of the carriage 22 wherein the mechanical fastener 34 is used to create a compression force between the second bracket member 32 and the bottom support 26, thereby coupling the light-based guidance system 5 to the carriage 22.

The housing module 21 is preferably configured to house a battery 38. In one embodiment an opening 33 may be included in the housing module 21 for easy access to the battery 38, a protective cover may be placed over the opening 33 when in use. The battery 38 may be any type known in the industry including a rechargeable nickel metal hydride battery. The battery 38 is electrically connected via the electrical connector 41 to supply electrical current to the lighting housing module 7. A length of the battery housing 21 may be determined based upon a vertical dimension of the carriage 22. In one embodiment, the housing module 21 is less than 1.5 inches deep, as most commercially available fork vertical load stop members 96 are at least 1.5 inches deep.

Figure 6:
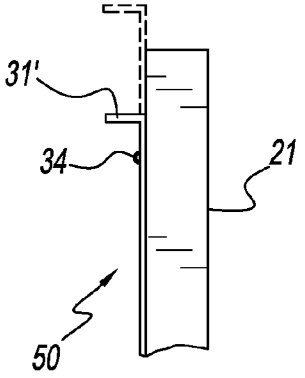
FIG. 6 depicts the first mounting apparatus including an alternative embodiment of a first bracket member, in accordance with the present disclosure.

FIG. 6 depicts the first mounting apparatus with an alternative embodiment of the first bracket member 31' that is vertically adjustable. As shown in FIG. 6, the alternative embodiment of the first bracket member 31' is mounted to the back of the battery housing 21. The alternative embodiment of the first bracket member 31' has adjustment means such as a vertical slot configured to receive a mechanical fastener 34', where the position of the alternative embodiment of the first bracket member 31' relative to the battery housing 21 may be adjusted based upon a vertical height of a particular carriage embodiment.

Figure 7:
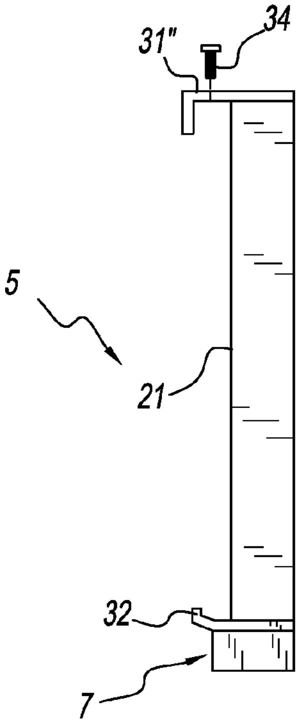
FIG. 7 depicts the first mounting apparatus including a hooked embodiment of the first bracket member, in accordance with the present disclosure.

FIG. 7 depicts the first mounting apparatus including a hooked embodiment of the first bracket member 31". The first bracket member 31, described hereinabove and illustrated in FIGS. 4 and 5, and the alternative embodiment of the first bracket member 31', described and illustrated in FIG. 6 may additionally be configured in a hook-like manner as described herein below with reference to FIG. 7. As FIG. 7 shows, the hooked embodiment of the first bracket member 31" is configured to secure the battery housing 21 to the carriage 22 using the weight of the light-based guidance system 5. The second bracket member 32 is used to secure the battery housing 21 to the carriage 22 after laterally sliding the light-based guidance system 5 horizontally from the notch 39 in the carriage 22 into a horizontal position along the carriage 22. In one embodiment the first bracket member 31 may include a looking mechanism such as a wedge pin or threaded mechanical fastener. After positioning the light-based guidance system 5 along the carriage 22, the lock mechanism may be engaged to prohibit the light-based guidance system 5 from moving along the carriage 22 while operating the forklift 10.

Figure 8:
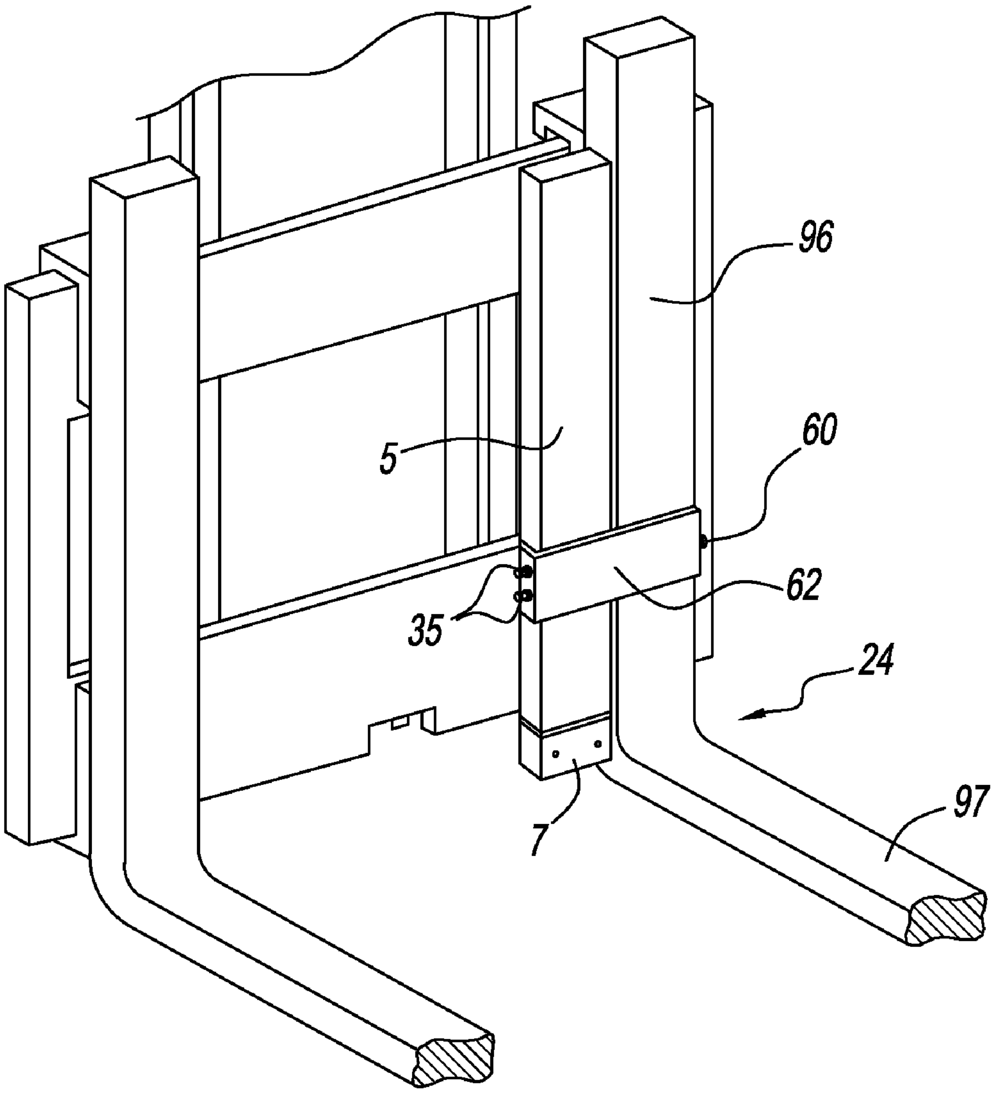
FIG. 8 is a perspective view of a second mounting apparatus used to couple the light-based guidance system to a vertical load stop member of a fork, in accordance with the present disclosure.

FIG. 8 is a perspective view of a second mounting apparatus for coupling the light-based guidance system 5 to one of the vertical load stop members 96 of the fork 24. As FIG. 8 shows, the second mounting apparatus includes a clamp or bracketing device 62 configured to wrap around the vertical load stop member 96 and the housing 21 of the light-based guidance system 5. The bracketing device 62 couples the light-based guidance system 5 to the vertical load stop member 96 using an adjustment fastener 60 and one or more threaded fasteners 35 configured to hold the light-based guidance system 5 against the vertical load stop member 96. The adjustment fastener 60 and threaded fasteners 35 hold the light-based guidance system 5 to the vertical load stop member 96 by increasing a compression force between the light-based guidance system 5 and the bracketing device 62 and therefore creating a compression force between the light-based guidance system 5 and the vertical load stop member 96. The adjustment fastener 60 and threaded fasteners 35 are configured to adjust position of the bracketing device 62 to accommodate different sizes, i.e., different thicknesses, of vertical load stop members including, in one embodiment, vertical load stop members varying from an inch to five inches.

Figure 9:
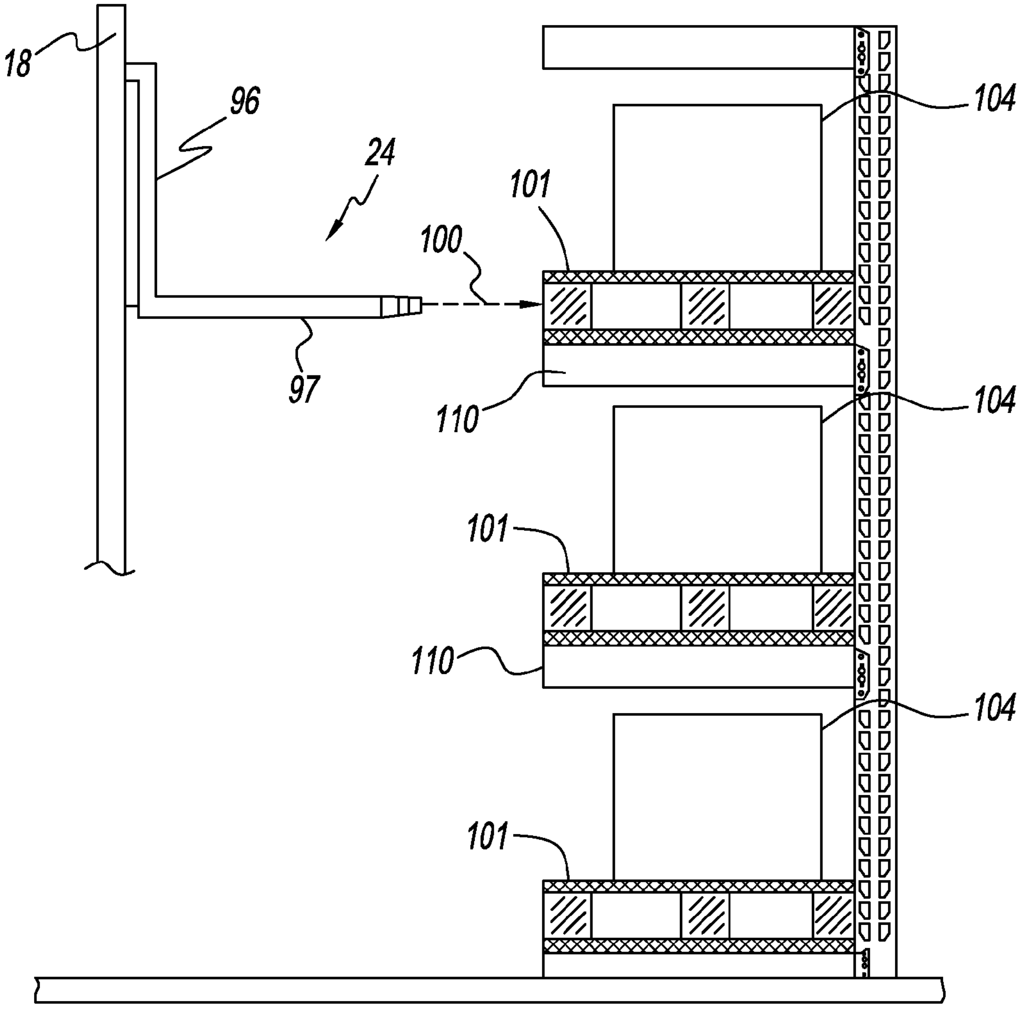
FIG. 9 is a side view of the light-based guidance system in operation prior to a forklift operator inserting the forks into a pallet, in accordance with the present disclosure.
Figure 10:
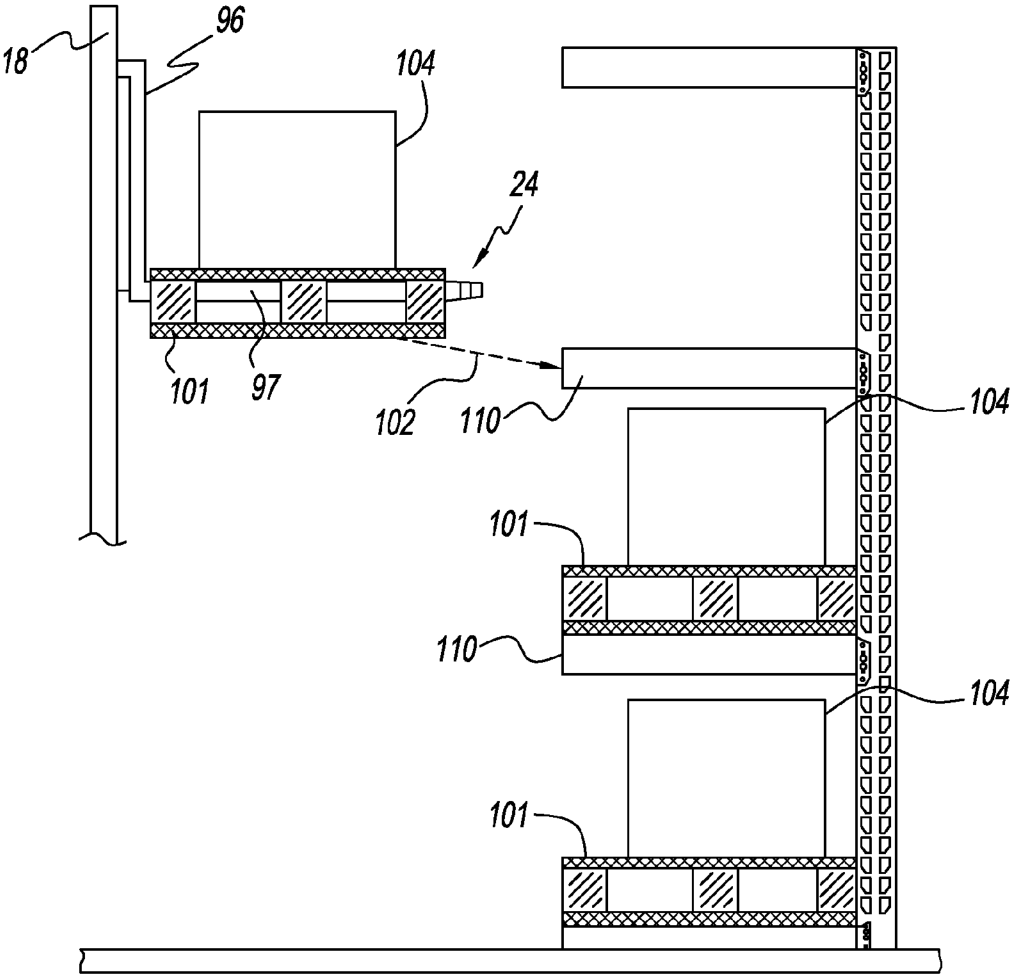
FIG. 10 is a side view of the light-based guidance system in operation subsequent to the forklift operator inserting the forks into the pallet, in accordance with the present disclosure.

FIGS. 9 and 10 show the light-based guidance system 5 in operation including first and second light beams 100 and 102. The first light beam 100 is emitted from the first light beam emitting device 11 and provides a visual indicator to the forklift operator of the height of the forks 24 relative to the object upon which the light beam impinges. The second light beam 102 is emitted from the second light beam emitting device 13 and provides a visual indicator to the forklift operator that may be used as a reference to determine a vertical height of the pallet 101 relative to the object upon which the light beam impinges.

The first and second light beams 100 and 102 may be emitted concurrently or alternatively. For example, in one embodiment the first light beam 100 is emitted before advancing the forks 24 under a load without emitting the second light beam. Subsequent to loading a load on the forks 24, the first light beam 100 is discontinued and the second light beam 102 is emitted to aid the forklift operator while unloading the load.

FIG. 9 is a side view of the light-based guidance system 5 in operation prior to the forklift operator inserting the forks 24 into the pallet 101. Prior to inserting the forks 24 into the pallet 101, the forklift operator adjusts the height of the forks 24 based upon the visual indication from the light beam 100 emitted from the first light beam emitting device 11. As described herein above, the specific visual indication produced for the forklift operator may vary based upon color, shape, and frequency of emission. Shape is determined based upon the particular lens fitted over the first light beam emitting device 11. In an embodiment wherein the light beam is shaped into a dot, a preferential height of the carriage is indicated on a pallet when the dot impinges a center support or, alternatively, when the dot visually disappears into an access opening of the pallet, thereby indicating to the operator that the forks 24 are correctly positioned for insertion. Conversely, if the forks 24 are not at a preferential height, the light beam 100 will impinge on an upper or lower deck members of the pallet 101, or on the load 102 or a shelf or support rack 110. The position of the visible dot on these objects indicates to the operator whether to adjust the height of the forks 24 for unimpeded insertion into the pallet. In an embodiment wherein the light beam is shaped into a horizontal line, a preferential height of the forks 24 is indicated on a pallet when the horizontal line impinges over a substantially central line with respect to a height of the pallet, thereby indicating to the operator that the forks 24 are correctly positioned for insertion. Conversely, if the forks 24 are not at a preferential height, the horizontal line will impinge at a higher or lower height with respect to a central height of the pallet.

FIG. 10 is a side view of the light-based guidance system 5 in operation subsequent to the forklift operator inserting the forks 24 into the pallet 101. Prior to unloading the pallet 101 off the forks 24, the forklift operator adjusts the height of the forks 24 based upon the visual indication from the light beam 102 emitted from the second light beam emitting device 13. As described herein above, the specific visual indication produced for the forklift operator may vary based upon color, shape, and frequency of emission. Shape is determined based upon the particular lens fitted over the second light beam emitting device 13. A preferential height of the forks 24 is indicated on an object when the light beam 102 impinges an area proximity unimpeded by objects, thereby indicating to the operator that the forks 24 are correctly positioned for unloading the pallet 101. Conversely, if the forks 24 are not at a preferential height, the light beam 102 will impinge on an obstruction or area proximity impeded by objects and undesirable for unloading the pallet 101. The position of the visible dot on these objects indicates to the operator whether to adjust the height of the forks 24.

Figure 11:
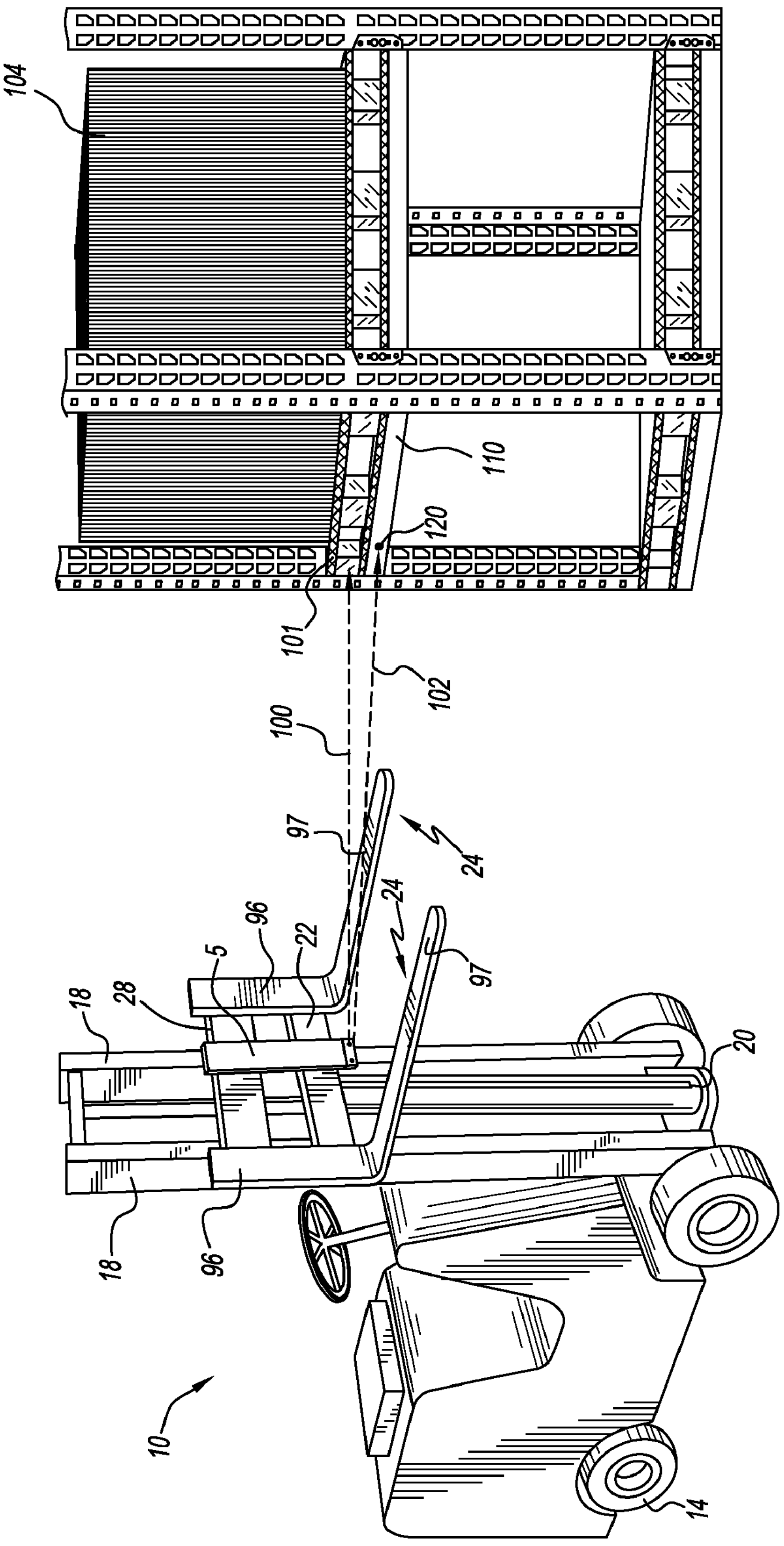
FIG. 11 is a forward perspective view of the first and second light beams, in accordance with the present disclosure.

FIG. 11 is a forward perspective view of the first and second light beams 100 and 102 as illustrated on an exemplary application. The first light beam 100 is illustrated as an exemplary laterally elongated light beam. During operation, the laterally elongated light beam impinges across the pallet 101 whereat portions of the light beam disappear into recesses of the pallet 101. As FIG. 11 shows, when the light beam 100 crosses a substantially, vertically central position on the pallet 101, the forks 24 may safely advance into the pallet 101. The second light beam 102 is illustrated as a dot 120. During unloading operation, the dot 120 impinges a predetermined vertical distance less below a safe loading area, shown in FIG. 11 as impinging a rack 110, indicating to the forklift operator that the forks 24 may be safely advanced to unload the load 104 and pallet 101.

Additionally, the light-based guidance system 5 may include one or more control schemes for controlling an operational state of the first and second light beam emitting devices 11 and 13. The control schemes may be implemented in one or more devices, e.g., implemented in software, hardware, and/or application-specific integrated circuitry. For example, a control scheme may be executed as one or more algorithms in a microprocessor and electrical circuitry configured to control the operational state of the first and second light beam emitting devices 11 and 13. Controlling the operational state may be preferential in particular operating conditions to improve battery life, mitigate risk to persons proximally located to the forklift, and inhibit damage to the first and second light beam emitting devices 11 and 13 when operating in predetermined ambient temperatures.

A first control scheme permits operation of the first and second light beam emitting devices 11 and 13 when a predetermined magnitude of vibration is monitored, such as from the operation or the forklift motor or movement of the forklift. When vibrations less than a predetermined threshold are monitored, the vibration-responsive actuation means controls the operating state of the light-based guidance system 5 to an OFF operating state. This precludes the need for manually activation and deactivation, thereby improving operator efficiency, saving battery life, and ensuring that the laser beams are produced only when the forklift is operational.

A second control scheme permits operation of the first and second light beam emitting devices 11 and 13 when a height of the light-based guidance system 5 is greater than a predetermined minimal threshold height above a ground or floor level. Height may be determined using one of multiple methods including using light-based means such as photosensors, or lasers, using sound-based means such as sonar or ultrasonic range finding systems, and using magnetic-based detection sensors. The height-responsive actuation means 50 saves battery life and prevents bodily injury by inhibiting accidental aiming of the light beam 100 into a person's eyes. For example, in one embodiment the minimum threshold height for actuation could be set at seven feet, such that the first and second light beam emitting devices 11 and 13 is controlled to an OFF operating state at a height less than seven feet.

A third control scheme controls the operating state of the first and second light beam emitting devices 11 and 13 based upon distance between the light-based guidance system 5 and a load or pallet. Distance may be determined using one of multiple methods including using light-based means such as photosensors, or lasers, using sound-based means such as sonar range finding systems, and using magnetic-based detection sensors. In one embodiment, the light-based guidance system 5 is controlled to an ON operational state when the light-based guidance system 5 is at a minimum predetermined threshold distance from the load 101 and/or pallet 100. Additionally, or alternatively, the light-based guidance system 5 is controlled to an ON operational state when the light-based guidance system 5 is at a maximum predetermined threshold distance from the load 101 and/or pallet 100. For example, the maximum predetermined threshold distance may be set at ten feet, such that the operating state of the light-based guidance system 5 is OFF when the light-based guidance system 5 is at a distance greater than ten feet from the load 101, and the minimum predetermined threshold distance may be set at one foot, such that the operating state of the light-based guidance system 5 is OFF when the light-based guidance system 5 is at a distance less than one feet from the load 101 such as when the forks 24 are inserted into the pallet 101. The operational state of the light-based guidance system 5 would be ON in this embodiment when the distance from the load is between 10 feet and one foot.

A fourth control scheme controls the operating state of the first and second light beam emitting devices 11 and 13 based upon an ambient temperature of an operating environment. Operation of the first and second light beam emitting devices 11 and 13 in high temperature conditions or low temperature conditions can be detrimental to material components comprising the first and second light beam emitting devices 11 and 13. As one skilled in the art will recognize, temperature may be determined using one of multiple methods including using a thermostat or thermistor.

The fourth control scheme permits operation of the first and second light beam emitting devices 11 and 13 when the ambient temperature is within a predetermined temperature range and controls the operating state of the first and second light beam emitting devices 11 and 13 to an OFF operating state when the ambient temperature is outside of the predetermined range. Subsequent to transitioning to an OFF operating state, when the monitored ambient temperature returns to the predetermined temperature range, the operating state of the first and second light beam emitting devices 11 and 13 is controlled to an ON operating state. In one embodiment, the fourth control scheme controls the operating state of the light-based guidance system 5 based upon a predetermined maximum threshold temperature and a predetermined minimum threshold temperature. When the monitored ambient temperature is greater than the predetermined maximum threshold temperature the operating state of the first and second light beam emitting devices 11 and 13 is controlled to an OFF operating state. Likewise, when the monitored ambient temperature is less than the predetermined minimum threshold temperature the operating state of the first and second light beam emitting devices 11 and 13 is controlled to an OFF operating state. In one exemplary embodiment, the maximum threshold temperature is set at 45 degrees C., such that the first and second light beam emitting devices 11 and 13 will only operate at temperatures less than 45 degrees C., and the minimal temperature may be set at 0 degrees C., for example, such that the first and second light beam emitting devices 11 and 13 will operate only at temperatures greater than 0 degrees C.

A fifth control scheme controls the operating state of the first and second light beam emitting devices 11 and 13 based upon a loading state of the forklift. The fifth control scheme controls emission of the first and second light beams 100 and 102 alternatively. Before loading a load on the forks 24, only the first light beam 100 is emitted. After loading the load on the forks 24 only the second light beam 102 is emitted. Detecting a load may be accomplished using one of multiple methods including using sonic and sound based detection or using light-based detection such as a visual photocell. In one embodiment, weight on the forks 24 is measured, using, for example, load cells or strain gauges. Using a predetermined threshold weight, the operating state of the first and second light beam emitting devices 11 and 13 is controlled. For example when the measured weight is less than the threshold weight only the first light beam 100 is emitted. After a weight greater than the threshold weight is measured the first light beam emitting device is controlled to an OFF operating state and the operating state of the second light beam emitting device 13 is switched to an ON operating state.

Any or all the abovementioned control schemes may be incorporated into the light-based guidance system 5, along with time delay circuits such that the actuation or non-actuation is not immediate when a triggering condition occurs.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A light-based guidance system mountable on a forklift comprising a plurality of load bearing members, the light-based guidance system comprising:

a first light source disposed within a housing of the light-based guidance system, wherein the first light source is configured to emit a first light beam that is substantially parallel with the load bearing members; and a second light source disposed within the housing and configured to emit a second light beam.

2. The system of claim 1, wherein the second light beam is aligned with a forward path trajectory of a load that is supported by the load bearing members.

3. The system of claim 1, further comprising:

a mounting apparatus configured to couple the light-based guidance system to a carriage assembly of the forklift.

4. The system of claim 3, wherein the mounting apparatus comprises a first bracket member configured to receive a mechanical fastener and a second bracket member configured to abut against an underside of a bottom support of the carriage assembly.

5. The system of claim 4, wherein the first bracket member is vertically adjustable based upon vertical dimensions of the carriage assembly.

6. The system of claim 4, wherein the first and second bracket members are configured in a hook-like configuration.

7. The system of claim 1, further comprising:

a mounting apparatus configured to couple the light-based guidance system to a vertical load stop member of one of the plurality of load bearing members.

8. The system of claim 7, wherein the mounting apparatus comprises a bracketing device configured to wrap around the vertical load stop member.

9. The system of claim 8, wherein the bracketing device further comprises a threaded fastener configured to hold the light-based guidance system against the vertical load stop member.

10. Method for guiding a plurality of load bearing members of a forklift, the method comprising:

emitting a first light beam substantially parallel with the load bearing members; and emitting a second light beam; and guiding the plurality of load bearing members based upon a position of irradiated light from the first and second light beams.

11. The method of claim 10, further comprising:

loading a pallet onto the plurality of load bearing members based upon the position of irradiated light from the first light beam.

12. The method of claim 10, further comprising:

unloading a pallet from the plurality of load bearing members based upon the position of irradiated light from the second light beam.

13. The method of claim 10, further comprising:

shaping the first light beam into a first predetermined shape comprising at least one of a dot, horizontal line, and cross; and shaping the second light beam into a second predetermined shape comprising at least one of a dot, horizontal line, and cross.

14. The method of claim 13, wherein the first and second predetermined shape are shaped differently.

15. The method of claim 10, wherein the first light beam is emitted at a first visible light wavelength corresponding to a first color, and wherein the second light beam is emitted at a second visible light wavelength corresponding to a second color.

16. The method of claim 15, wherein the first and second colors correspond to different light wavelengths on a visible light spectrum.

17. The method of claim 10, further comprising:

controlling an operating state of the light-based guidance system based upon ambient temperature.

18. The method of claim 10, further comprising:

controlling an operating state of the light-based guidance system based upon monitored vibration of the forklift.

19. The method of claim 10, further comprising:

controlling an operating state of the light-based guidance system based upon height of the light-based guidance system above a ground level.

20. The method of claim 10, further comprising:

controlling an operating state of the light-based guidance system based upon distance of the light-based guidance system from a load.

21. The method of claim 10, further comprising:

differentiating the first and second light beams based upon at least one of shape, color, and frequency of emission.

22. Method for guiding a plurality of load bearing members of a forklift, the method comprising:

emitting a first light beam substantially parallel with the load bearing members; and emitting a second light beam at an acute angle less than a horizontal plane accompanied by the load bearing members;

loading a pallet onto the plurality of load bearing members based upon the position of irradiated light from the first light beam; and unloading a pallet from the plurality of load bearing members based upon the position of irradiated light from the second light beam.

23. The method of claim 22, further comprising:

controlling an operating state of the light-based guidance system based upon at least one of an ambient temperature, monitored vibration of the forklift, height of the light-based guidance system above a ground level, and distance of the light-based guidance system from a load.

24. The method of claim 22, further comprising:

differentiating the first and second light beams based upon at least one of shape, color, and frequency of emission;

shaping the first light beam into a first predetermined shape comprising at least one of a dot, horizontal line, and cross; and shaping the second light beam into a second predetermined shape comprising at least one of a dot, horizontal line, and cross.

* * * * *